United States Patent Office — 3,637,837, Patented Jan. 25, 1972

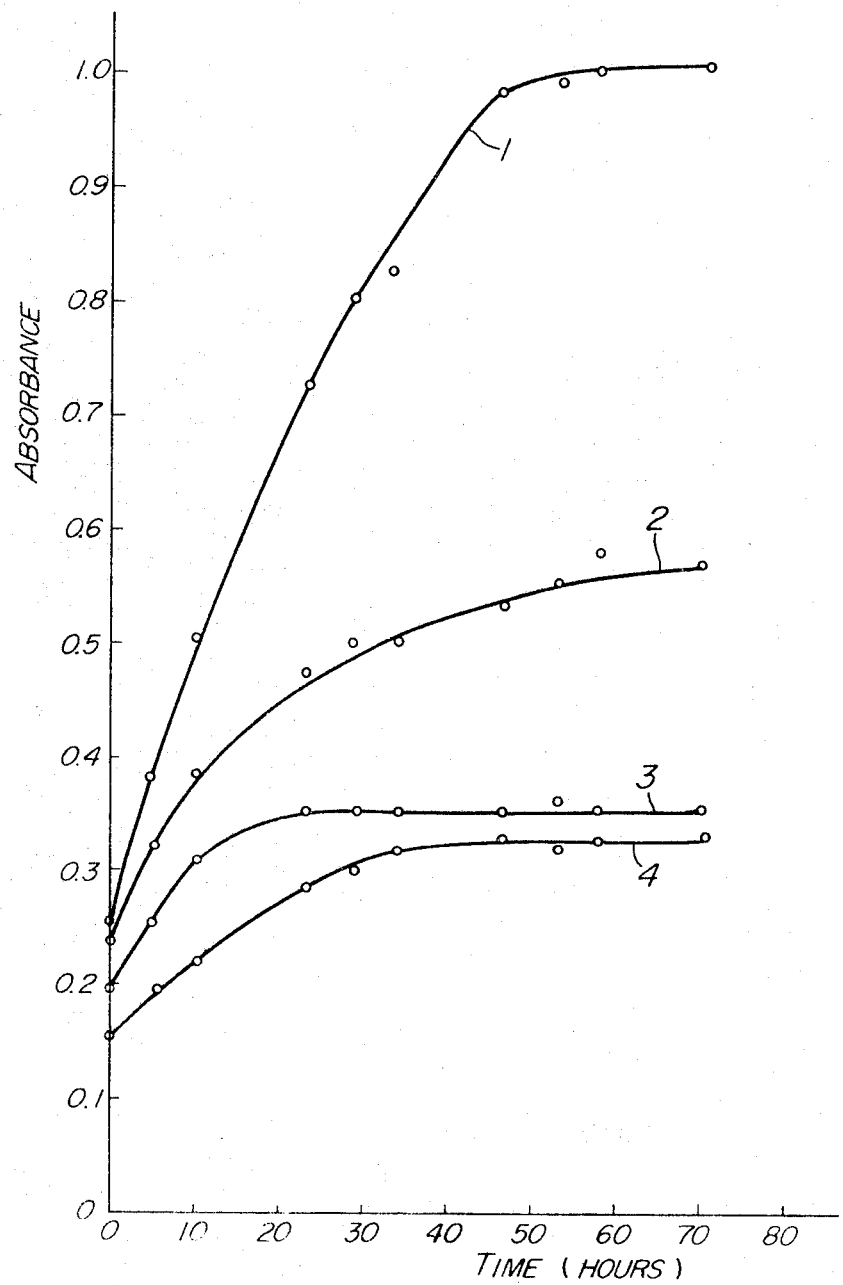

3,637,837
γ-ALKYLTHIOLYSINES

Yasuo Fujimoto and Shinsuke Koshimoto, Machida-shi, Japan, assignors to Kyowa Hakko Kogyo Co., Ltd., Tokyo, Japan
Filed Oct. 16, 1968, Ser. No. 768,134
Int. Cl. C07c *149/20, 149/24*
U.S. Cl. 260—534 S          14 Claims

ABSTRACT OF THE DISCLOSURE

γ-Alkylthiolysines and a process for producing them which comprises reacting γ-chlorolysine or an acid salt thereof with an alkylmercaptan, or an alkali metal or alkaline earth metal salt thereof. The reaction is preferably conducted in an inert solvent with heating. The resultant lysine derivatives are useful as anti-oxidants, as topical agents for the treatment of wounds and burns and as anti-tumor agents.

---

The present invention relates to novel lysine derivatives, more specifically, to γ-alkylthiolysines. More particularly, it relates to a process for the production of novel lysine derivatives having the formula

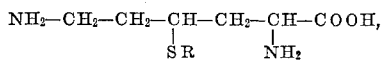

wherein R is a lower alkyl group. Even more particularly, the invention relates to a process for producing said lysine derivatives by reacting γ-chlorolysine or an acid salt thereof with mercaptan derivatives or salts thereof.

One of the objects of the present invention is to provide a process for the production of novel lysine derivatives.

Another object of the present invention is to provide a process for producing γ-alkylthiolysines which may be carried out in an efficacious and simple manner.

A further object of the invention is to provide γ-alkylthiolysines, which are novel and useful lysine derivatives.

These and other objects and advantages of the present invention will become apparent to those skilled in the art from a consideration of the following specification and claims.

In accordance with the present invention, it has been found that novel and useful lysine derivatives, i.e., γ-alkylthiolysines, may be produced by treating γ-chlorolysine or an acid salt thereof with mercaptan derivatives or salts thereof, represented by R–SH, wherein R is a lower alkyl group, in a suitable liquid medium. Suitable liquids which may be employed include water or an organic solvent such as an alcohol (for example, methanol, ethanol, etc.) and an ether. Mixtures thereof may be utilized. The resultant product is a γ-alkylthiolysine having the formula shown hereinabove.

The γ-alkylthiolysines obtained by the process of the present invention are novel amino acids which may be used as anti-oxidation agents or as agents for accelerating the healing of wounds or burns. These compounds also exhibit anti-tumor activity. It can thus be seen that the novel lysine derivatives of the present invention are useful substances which can be readily employed.

The γ-chlorolysine used as a starting material in the process of this invention can be obtained easily by passing chlorine through a concentrated acid solution of lysine under the irradiation of light. In accordance with this invention, γ-chlorolysine or an acid salt of γ-chlorolysine is dissolved in water or organic solvents such as alcohols or ethers, or a mixture thereof, and an alkylmercaptan alkali metal salt or an alkaline earth metal salt (for example, the sodium salt, potassium salt, calcium salt, etc.) or an alkylmercaptan is added for reaction therewith. It is preferable to heat the reaction mixture so as to complete the reaction in a short period of time. The better results are obtained by carrying out the reaction at a temperature between 20 to 120° C. After the reaction is completed, the solvent is removed by distillation in cases where organic solvents other than water are used, and the reaction product is dissolved in water. The γ-alkylthiolysine is obtained from the aqueous solution by the usual method, for example, by adsorbing the reaction product on a basic or acidic ion exchange resin and thereafter desorbing the same by acid or alkali, or by precipitating the reaction product at the isoelectric point. Details on this general procedure are shown in the examples hereinbelow.

The γ-chlorolysine used as the starting material may be optically active or inactive. Various organic solvents, such as alcohols, for example, methanol, ethanol, n-propanol and isomers thereof, n-butanol and isomers thereof, n-amyl alcohol and isomers thereof, or n-hexanol and isomers thereof, and ethers, such as ethyl ether, propyl ethers, butyl ethers, methyl ethyl ether, methyl propyl ethers, ethyl propyl ethers, ethyl butyl ethers, or butyl propyl ethers, can be used as the reaction solvent. However, when organic solvents are used, the reaction time may be prolonged since the solubility of γ-chlorolysine therein is low. As a simple method of determining the reaction completion time, the chlorine ion can be measured. Alternatively, such an analysis can be carried out by paper chromatography or by thin layer chromatography.

In the accompanying drawing where relationships between absorbancy and time are shown with respect to various samples:

line (1) shows blank test,
line (2) plus ascorbic acid,
line (3) plus γ-methylmercapto-L-lysine, and
line (4) plus butylhydroxyanisole.

The following examples are given merely as illustrative of the present invention and are not to be considered as limiting.

EXAMPLE 1

50 g. of γ-chloro-L-lysine is dissolved in 100 ml. of water and 200 ml. of ethanol, to which 25 g. of sodium salt of methylmercaptan is added, and the mixture is heated in a water bath for 7 hours with stirring. The termination of the reaction is indicated by the quantitative measurement of chlorine ion. Upon completion of the reaction, the ethanol is removed by distillation under reduced pressure and 400 ml. of water is newly added to increase the total volume to 500 ml. The solution is passed through a column of IRC–50 H⁺-type resin to decompose the excess sodium salt of methylmercaptan.

The effluent is passed through a column containing a strongly acidic ion exchange resin (NH₄-type), Dowex 50 x 8 (trade name), to adsorb the objective γ-methylthio-L-lysine. After washing with water, γ-methylthio-L-lysine is separated by elution with 2N—NH₄OH and the eluate is concentrated under reduced pressure. Then, absolute ethanol is poured into the concentrate, whereby γ-methylthio-L-lysine precipitates. After drying, 42 g. of γ-methylthio-L-lysine is obtained. The elementary analysis is shown below.

Theoretical values: C, 43.74; H, 8.39; N, 14.58; S, 16.65.
Measured values: C, 43.22; H, 8.30; N, 14.70; S, 15.92.

EXAMPLE 2

50 g. of γ-chloro-L-lysine is suspended in 300 ml. of methanol and is refluxed with vigorous stirring. 25 g. of sodium salt of methylmercaptan is added to the reflux and is continuously heated for 12 hours with stirring. Upon completion of the reaction, methanol is removed by distillation under reduced pressure and the residue is dissolved in 500 ml. of water. After neutralizing with 6N—HCl, the solution is passed through a column of H+-type strongly acidic for exchange resin and is then washed with water until the chlorine ion becomes negative. Thereafter, the reaction product is removed by elution with 2N—NH₄OH. The eluate is once concentrated to a glutinous solid, which is again dissolved in 100 ml. of water. By freeze-drying of the solution, 39 g. of γ-methyl-L-lysine is obtained.

EXAMPLE 3

50 g. of γ-chloro-D-lysine is dissolved in 200 ml. of water, to which 32 g. of potassium salt of methylmercaptan is added, and the mixture is refluxed with heating for 3 hours. Upon completion of the reaction, 200 ml. of water is added and the solution is passed through a column of strongly basic ion exchange resin. After washing with water sufficiently, the reaction product is separated by elution with 2N—HCl. The eluate is concentrated to a solid and the resultant solid is dissolved in 200 ml. of methanol. Pyridine is added to neutralize the solution until the solution is no longer acidic as determined by a Congo Red test paper. γ-Methylthio-D-lysine. HCl precipitates immediately. After separating the precipitate by filtering, 45 g. of γ-methylthio-D-lysine·HCl is obtained.

EXAMPLE 4

50 g. of γ-chloro-DL-lysine dihydrochloride is suspended in 300 ml. of ethanol, in which 30 g. of methylmercaptan is dissolved and, after closing the reaction vessel, the mixture is stirred for 3 hours at 100° C. Ethanol is removed by distillation and the residue is dissolved in 300 ml. of water. Upon drying the solution under reduced pressure, 52 g. of deliquescent crude γ-methylthio-DL-lysine dihydrochloride is obtained. The product is dissolved in water, neutralized with aqueous ammonia and then passed through a column of H+-type strongly acidic ion exchange resin to absorb the reaction product. After washing the resin with water until no chlorine ion is present, the reaction product is separated by elution with 2N—NH₄OH and the eluate is contrated under reduced pressure. By adding absolute ethanol, 29 g. of γ-methylthio-DL-lysine is obtained as a precipitate.

EXAMPLE 5

50 g. of γ-chloro-L-lysine is added to 100 ml. of water and 200 ml. of ethanol, to which 30 g. of sodium salt of ethylmercaptan is added, and the reaction is carried out under reflux with heating. Upon completion of the reaction, the reaction mixture is concentrated under reduced pressure and is then diluted with 200 ml. of water. After neutralizing with 6N—HCl, the solution is passed through a column of H+-type strongly acidic ion exchange resin and, thereafter, the operation is carried out in the same manner as in Example 2. 39 g. of γ-ethylthio-L-lysine is obtained. The result of elementary analysis is as follows:

Theoretical values: C, 46.59; H, 8.80; N, 13.58; S, 15.50. Measured values: C, 45.72; H, 8.40; N, 13.06; S, 15.12.

EXAMPLE 6

50 g. of γ-chloro-L-lysine and 35 g. of the sodium salt of isopropylmercaptan are dissolved in a mixed solvent of 100 ml. of water and 200 ml. of ethanol, and the mixture is refluxed with heating for 7 hours with stirring. Upon completion of the reaction, excess sodium salt of isopropylmercaptan is decomposed with 6N—HCl. Thereafter the same operation as in Example 2 is repeated to obtain 42 g. of γ-isopropylthio-L-lysine. The elementary analysis is shown below.

Theoretical values: C, 49.09; H, 9.09; N, 12.73; S, 14.55. Measured values: C, 48.92; H, 9.15; N, 12.67; S, 14.23.

EXAMPLE 7

50 g. of γ-chloro-L-lysine and 40 g. of the sodium salt of amylmercaptan are dissolved in 300 ml. of water, and the mixture is refluxed with heating for 8 hours with stirring. Upon completion of the reaction, excess sodium salt of n-amylmercaptan is decomposed by treatment with a H+-type weakly acidic ion exchange resin. After separating the resin by filtration, the filtrate is absorbed on a OH⁻-type strongly basic resin. After washing with water, the reaction product is separated by elution with 1N—HCl. The eluate is concentrated under reduced pressure to a syrupy solid, which is dissolved in 150 ml. of methanol. The resultant solution is poured in a mixed liquid of 600 ml. of ethanol and 100 ml. of ether, whereby γ-(n-amylthio)-L-lysine·2HCl precipitates. After drying, 49 g. of γ-(n-amylthio)-L-lysine·2HCl is obtained. The elementary analysis is shown below.

Theoretical values: C, 41.12; H, 8.10; N, 8.72; S, 9.97. Measured values: C, 41.30; H, 8.13; N, 8.79; S, 9.88.

REFERENCE EXAMPLE 1

The substances obtained in accordance with the present invention possess anti-tumor activity. The results obtained in the experiments to determine the anti-tumor activity are shown below. γ-Methylmercapto-L-lysine was used as a test sample. In the light of the acute toxic value on the mouse, the test mice were divided into two groups, i.e. a large dosage group to which a dose of 800 mg./kg. is to be administered, and a small dosage group to which a dose of 270 mg./kg. is to be administered. Each of the mice of dd type ♂ having a weight of 20 g. was subcutaneously inoculated with Sa-180 (Bulgaria strain) on the axilla. From the 5th day after the inoculation, an administration was effected into the abdominal cavity successively once a day extending over 5 days in accordance with the above identified dosages; 15 days after the inoculation of Sa-180, the tumor was taken out to measure the weight thereof. In order to reconfirm the results thereby obtained, the experiments were repeated in the same manner as above, and thus the experiments were conducted twice in all. The results obtained in these experiments are shown below. For comparison sake, Mitomycin C being presently was used in these experiments.

|  | γ-Methylmercapto-L-lysine | | | | Mitomycin C, 1.5 mg./kg. | Control group | |
|---|---|---|---|---|---|---|---|
|  | 800 mg./kg. | | 270 mg./kg. | | | | |
|  | Ex. 1 | Ex. 2 | Ex. 1 | Ex. 2 | | Ex. 1 | Ex. 2 |
| Average weight | 0.80 | 0.61 | 0.86 | 0.52 | 0.25 | 1.25 | 0.98 |
| Standard deviation | 0.46 | 0.86 | 0.43 | 0.26 | 0.23 | 1.21 | 0.48 |
| Inhibition percentage | 36 | 38 | 31 | 47 | 75 | | |

REFERENCE EXAMPLE 2

The substances obtained in accordance with the present invention exhibit sufficient anti-oxidation activity when they are used as additives in the amount of 0.01 to 0.1%. The results obtained in the anti-oxidation tests conducted to determine the anti-oxidation activity are shown below.

In the tests, sodium linoleate was used as a substrate, and the linoleate was oxidized by treating the same at a determined temperature in an aqueous solution to which a test sample had been added, and the resultant peroxide was measured with the lapse of time to examine the anti-oxidation ability of the sample.

1.4 g. of linoleic acid is dissolved in 5 ml. of 1 N sodium hydroxide and is further diluted to 500 ml. with borate buffer solution of pH 9.0 to prepare a linoleic acid substrate. 200 ml. of the substrate (0.2 millimole of linoleic acid) is poured in a test tube, into which is added 10 ml. (0.1 millimole of the test sample) of 0.01 M test solution to be subjected to the anti-oxidation test. 10 ml. of the buffer solution is added thereto with mixing. As the samples to be subjected to the anti-oxidation test, there are used ascorbic acid, butyl-hydroxy-anisole, and γ-methylmercapto-L-lysine. The mixture is placed in a thermostat kept at 37° C., and 2 ml. of each is collected with the lapse of time. The respective samples thus collected are charged with 2 ml. of 0.75% thiobarbituric acid, and the mixture is heat treated in boiling water for 15 minutes, whereby a red color is produced. The measurement is conducted on the resultant red color at an absorbancy of 353 mμ. Oxidation curves of linoleic acid measured in cases where the respective samples subjected to the anti-oxidation test were added are shown in the accompanying drawing. As is apparent from the drawing, γ-methylmercapto-L-lysine shows a stronger anti-oxidation activity than ascorbic acid, and further shows approximately the same effect as in the case of butyl-hydroxy-anisole, which is most widely used at present as an anti-oxidation agent.

The expression "lower alkyl" used in the present application is meant to include alkyl groups containing from 1 to 6 carbon atoms such as, for example, methyl, ethyl, n-propyl, i-propyl, n-butyl, s-butyl, i-butyl, t-butyl, amyl, hexyl and the like.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A compound of the formula

$$NH_2-CH_2-CH_2-CH-CH_2-CH-COOH,$$
$$\phantom{NH_2-CH_2-CH_2-}SR\phantom{-CH_2-}NH_2$$

wherein R is a lower alkyl group.
2. γ-Methylthio-lysine.
3. γ-Ethylthio-lysine.
4. γ-(n-propylthio)-lysine.
5. γ-(i-propylthio)-lysine.
6. γ-(n-butylthio)-lysine.
7. γ-(s-butylthio)-lysine.
8. γ-(i-butylthio)-lysine.
9. γ-(t-butylthio)-lysine.
10. γ-(n-amylthio)-lysine.
11. γ-(t-amylthio)-lysine.
12. γ-(s-amylthio)-lysine.
13. [γ-(act-amylthio)-lysine] γ-(2 - methylbutylthio)-lysine.
14. γ-(hexylthio)-lysine.

References Cited
UNITED STATES PATENTS
2,452,653   11/1948   Harris et al. _____ 260—534 S

OTHER REFERENCES

Journal of the American Chemical Soc., vol. 54, pp. 1985–1987; 1932.

Chemistry of Organic Compounds, Noller, 1965, p. 304.

LORRAINE A. WEINBERGER, Primary Examiner

J. L. DAVISON, Assistant Examiner

U.S. Cl. X.R.

260—398.5; 424—319

UNITED STATES PATENT OFFICE
CERTIFICATE OF CORRECTION

Patent No. 3,637,837          Dated January 25, 1972

Inventor(s) Yasuo FUJIMOTO, Shinsuke KOSHIMOTO

It is certified that error appears in the above-identified patent and that said Letters Patent are hereby corrected as shown below:

In column 1,

After line 6, insert

--Claims priority, application Japan, Oct. 23, 1967, 67841/67--

Signed and sealed this 29th day of August 1972.

(SEAL)
Attest:

EDWARD M. FLETCHER, JR.          ROBERT GOTTSCHALK
Attesting Officer                Commissioner of Patents